US008621573B2

(12) United States Patent
Bagepalli et al.

(10) Patent No.: US 8,621,573 B2
(45) Date of Patent: Dec. 31, 2013

(54) HIGHLY SCALABLE APPLICATION NETWORK APPLIANCES WITH VIRTUALIZED SERVICES

(75) Inventors: Nagaraj Bagepalli, San Jose, CA (US);
Prashant Gandhi, San Jose, CA (US);
Abhijit Patra, San Jose, CA (US); Kirti Prabhu, San Jose, CA (US); Anant Thakar, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 982 days.

(21) Appl. No.: 12/101,871

(22) Filed: Apr. 11, 2008

(65) Prior Publication Data
US 2009/0064288 A1 Mar. 5, 2009

Related U.S. Application Data

(60) Provisional application No. 60/966,649, filed on Aug. 28, 2007.

(51) Int. Cl.
*G06F 7/04* (2006.01)
*G06F 15/16* (2006.01)

(52) U.S. Cl.
USPC .................................................. 726/4; 726/3

(58) Field of Classification Search
None
See application file for complete search history.

(56) References Cited

U.S. PATENT DOCUMENTS

| 5,706,429 | A | 1/1998 | Lai et al. |
| 6,131,120 | A | 10/2000 | Reid |
| 6,205,480 | B1 | 3/2001 | Broadhurst et al. |
| 6,223,217 | B1 | 4/2001 | Pettus |
| 6,460,141 | B1 | 10/2002 | Olden |
| 6,594,712 | B1 | 7/2003 | Pettey et al. |
| 6,640,238 | B1 | 10/2003 | Bowman-Amuah |
| 6,658,469 | B1 | 12/2003 | Massa et al. |
| 6,675,200 | B1 | 1/2004 | Cheriton et al. |
| 6,728,884 | B1 | 4/2004 | Lim |
| 6,754,829 | B1 | 6/2004 | Butt et al. |
| 6,804,720 | B1 | 10/2004 | Vilander et al. |
| 6,889,294 | B1 | 5/2005 | Nichols et al. |

(Continued)

FOREIGN PATENT DOCUMENTS

| WO | WO 03/104943 A2 | 12/2003 |
| WO | WO 2005/081855 A2 | 9/2005 |

(Continued)

OTHER PUBLICATIONS

International Search Report and Written Opinion mailed Feb. 2, 2009, for International Application No. PCT/US08/10080, 10 pages.

*Primary Examiner* — Thuong Nguyen
*Assistant Examiner* — Matthew Lindsey

(57) ABSTRACT

An application network appliance with virtualized services is described herein. According to one embodiment, a packet of a network transaction is received from a client for accessing an application server of a datacenter, where the network element operates as an application services gateway of the datacenter. A context associated with the application server is identified based on the packet, including information that identifies application services to be performed on the packet and resources to be allocated for performing the application services. A context includes information representing a logical instance of physical resources of the network element shared by multiple contexts. One or more application services are performed on the packet using the resources identified by the context. Other methods and apparatuses are also described.

25 Claims, 10 Drawing Sheets

(56) References Cited

U.S. PATENT DOCUMENTS

| | | | |
|---|---|---|---|
| 6,901,491 B2 | 5/2005 | Kohn et al. | |
| 6,912,604 B1 | 6/2005 | Tzeng et al. | |
| 6,922,724 B1 | 7/2005 | Freeman et al. | |
| 6,947,984 B2 | 9/2005 | Schweitzer et al. | |
| 6,985,956 B2 * | 1/2006 | Luke et al. | 709/229 |
| 6,986,040 B1 | 1/2006 | Kramer et al. | |
| 6,999,462 B1 | 2/2006 | Acharya | |
| 7,010,807 B1 | 3/2006 | Yanovsky | |
| 7,051,126 B1 | 5/2006 | Franklin | |
| 7,080,378 B1 * | 7/2006 | Noland et al. | 718/104 |
| 7,088,727 B1 | 8/2006 | Short et al. | |
| 7,100,200 B2 | 8/2006 | Pope et al. | |
| 7,114,096 B2 | 9/2006 | Freimuth et al. | |
| 7,114,180 B1 | 9/2006 | DeCaprio | |
| 7,117,526 B1 | 10/2006 | Short | |
| 7,120,792 B1 * | 10/2006 | Jacobson et al. | 713/153 |
| 7,146,635 B2 | 12/2006 | Eggebraaten et al. | |
| 7,149,808 B2 | 12/2006 | Lu | |
| 7,149,817 B2 | 12/2006 | Pettey | |
| 7,149,819 B2 | 12/2006 | Pettey | |
| 7,149,892 B2 | 12/2006 | Freed et al. | |
| 7,171,681 B1 | 1/2007 | Duncan et al. | |
| 7,178,163 B2 | 2/2007 | Reeves, Jr. | |
| 7,185,192 B1 | 2/2007 | Kahn | |
| 7,185,361 B1 | 2/2007 | Ashoff et al. | |
| 7,185,364 B2 | 2/2007 | Knouse et al. | |
| 7,194,554 B1 | 3/2007 | Short et al. | |
| 7,197,556 B1 | 3/2007 | Short et al. | |
| 7,209,478 B2 | 4/2007 | Rojas et al. | |
| 7,209,970 B1 | 4/2007 | Everson et al. | |
| 7,209,977 B2 | 4/2007 | Acharya et al. | |
| 7,216,152 B2 | 5/2007 | Short et al. | |
| 7,216,225 B2 | 5/2007 | Haviv et al. | |
| 7,225,364 B2 | 5/2007 | Carnevale et al. | |
| 7,228,412 B2 | 6/2007 | Freed et al. | |
| 7,308,101 B2 | 12/2007 | Wing | |
| 7,350,229 B1 * | 3/2008 | Lander | 726/8 |
| 7,447,220 B2 | 11/2008 | Lu et al. | |
| 7,584,301 B1 * | 9/2009 | Joshi | 709/244 |
| 7,587,492 B2 * | 9/2009 | Dyck et al. | 709/226 |
| 7,630,877 B2 * | 12/2009 | Brown et al. | 703/21 |
| 7,633,955 B1 | 12/2009 | Saraiya et al. | |
| 7,693,991 B2 * | 4/2010 | Greenlee et al. | 709/226 |
| 7,764,678 B2 * | 7/2010 | Johnson et al. | 370/389 |
| 8,065,439 B1 * | 11/2011 | Johnson et al. | 709/250 |
| 2002/0107971 A1 | 8/2002 | Bailey et al. | |
| 2002/0129271 A1 * | 9/2002 | Stanaway et al. | 713/201 |
| 2002/0199006 A1 | 12/2002 | Magnussen et al. | |
| 2003/0005073 A1 | 1/2003 | Yoshizawa et al. | |
| 2003/0043794 A1 | 3/2003 | Cayton et al. | |
| 2003/0097454 A1 | 5/2003 | Yamakawa et al. | |
| 2003/0097518 A1 | 5/2003 | Kohn et al. | |
| 2004/0010545 A1 | 1/2004 | Pandya | |
| 2004/0010612 A1 | 1/2004 | Pandya | |
| 2004/0030757 A1 | 2/2004 | Pandya | |
| 2004/0030770 A1 | 2/2004 | Pandya | |
| 2004/0030806 A1 | 2/2004 | Pandya | |
| 2004/0037299 A1 | 2/2004 | Pandya | |
| 2004/0037319 A1 | 2/2004 | Pandya | |
| 2004/0128538 A1 | 7/2004 | Gmuender et al. | |
| 2004/0139319 A1 | 7/2004 | Favazza et al. | |
| 2004/0165588 A1 | 8/2004 | Pandya | |
| 2004/0181690 A1 | 9/2004 | Rothermel | |
| 2004/0210320 A1 | 10/2004 | Pandya | |
| 2004/0213284 A1 | 10/2004 | Clarke et al. | |
| 2005/0076166 A1 | 4/2005 | Shearer | |
| 2005/0108518 A1 | 5/2005 | Pandya | |
| 2005/0147039 A1 | 7/2005 | Biran et al. | |
| 2005/0188212 A1 | 8/2005 | Laferriere et al. | |
| 2005/0238035 A1 | 10/2005 | Riley | |
| 2005/0257267 A1 | 11/2005 | Williams | |
| 2005/0286513 A1 | 12/2005 | King | |
| 2006/0031506 A1 * | 2/2006 | Redgate | 709/226 |
| 2006/0045099 A1 | 3/2006 | Chang et al. | |
| 2006/0047771 A1 | 3/2006 | Blackmore et al. | |
| 2006/0067346 A1 | 3/2006 | Tucker et al. | |
| 2006/0069668 A1 | 3/2006 | Braddy et al. | |
| 2006/0070131 A1 | 3/2006 | Braddy et al. | |
| 2006/0074837 A1 | 4/2006 | Braddy et al. | |
| 2006/0075057 A1 | 4/2006 | Gildea et al. | |
| 2006/0075114 A1 | 4/2006 | Panasyuk et al. | |
| 2006/0075132 A1 | 4/2006 | Liu | |
| 2006/0075463 A1 | 4/2006 | Braddy et al. | |
| 2006/0080667 A1 | 4/2006 | Sanghvi | |
| 2006/0087989 A1 | 4/2006 | Gai et al. | |
| 2006/0095334 A1 | 5/2006 | Simmons | |
| 2006/0101225 A1 | 5/2006 | Aloni et al. | |
| 2006/0123481 A1 | 6/2006 | Bhatnagar et al. | |
| 2006/0136570 A1 | 6/2006 | Pandya | |
| 2006/0168274 A1 | 7/2006 | Alone et al. | |
| 2006/0174104 A1 | 8/2006 | Crichton et al. | |
| 2006/0200477 A1 | 9/2006 | Barrenechea | |
| 2006/0230119 A1 | 10/2006 | Hausauer et al. | |
| 2006/0233101 A1 | 10/2006 | Luft et al. | |
| 2006/0236063 A1 | 10/2006 | Hausauer et al. | |
| 2006/0236385 A1 | 10/2006 | Innes et al. | |
| 2006/0259661 A1 | 11/2006 | Feng et al. | |
| 2006/0262782 A1 | 11/2006 | Biran et al. | |
| 2006/0262796 A1 | 11/2006 | Biran et al. | |
| 2006/0262797 A1 | 11/2006 | Biran et al. | |
| 2006/0262799 A1 | 11/2006 | Biran et al. | |
| 2006/0268866 A1 | 11/2006 | Lok | |
| 2006/0277184 A1 | 12/2006 | Faitelson | |
| 2006/0291803 A1 | 12/2006 | Watson et al. | |
| 2007/0002769 A1 | 1/2007 | Matityahu et al. | |
| 2007/0005801 A1 | 1/2007 | Kumar et al. | |
| 2007/0067638 A1 | 3/2007 | Haibl et al. | |
| 2007/0073966 A1 | 3/2007 | Corbin | |
| 2007/0121615 A1 | 5/2007 | Weill et al. | |
| 2007/0130167 A1 | 6/2007 | Day et al. | |
| 2007/0153798 A1 | 7/2007 | Krstulich | |
| 2007/0160072 A1 | 7/2007 | Thalanany et al. | |
| 2007/0160073 A1 | 7/2007 | Toumura et al. | |
| 2007/0165672 A1 | 7/2007 | Keels et al. | |
| 2007/0171921 A1 | 7/2007 | Wookey et al. | |
| 2007/0174429 A1 | 7/2007 | Mazzaferri et al. | |
| 2007/0179955 A1 | 8/2007 | Croft et al. | |
| 2007/0180088 A1 | 8/2007 | Zhao | |
| 2007/0180447 A1 | 8/2007 | Mazzaferri et al. | |
| 2007/0180493 A1 | 8/2007 | Croft et al. | |
| 2007/0226750 A1 | 9/2007 | Sharp et al. | |

FOREIGN PATENT DOCUMENTS

| | | |
|---|---|---|
| WO | WO 2005/104443 A2 | 11/2005 |
| WO | WO 2006/031496 A2 | 3/2006 |
| WO | WO 2006/113722 A2 | 10/2006 |

* cited by examiner

HIGHLY SCALABLE APPLICATION NETWORK APPLIANCES WITH VIRTUALIZED SERVICES

RELATED APPLICATIONS

This application claims the benefit of U.S. Provisional Patent Application No. 60/966,649, filed Aug. 28, 2007, which is incorporated by reference herein in its entirety.

FIELD OF THE INVENTION

The present invention relates generally to application network appliances. More particularly, this invention relates to highly scalable application network appliances with virtualized services.

BACKGROUND

The ability to connect information technology infrastructure reliably, cost-effectively and securely is of high importance for today's global enterprises. To communicate with customers, clients, business partners, employees, etc., the Internet has proven to be more appropriate compared to private communication networks. However, communication via the Internet, which typically uses TCP/IP (Transmission Control Protocol/Internet Protocol), also increases the requirements for data security. Network firewalls are one of the many examples of solutions for network security.

Enterprise Web Application Services build an important foundation for such client, customer, and employee communication. A very common configuration for hosting such enterprise web Application Services is shown in FIG. 1. As shown in FIG. 1, an enterprise can offer web Application Services to various clients and there are several possibilities for clients to connect to the servers depending on the location of the client relative to the servers' location. The servers which provide the Application Services are typically located in the enterprise's data center 1016 and are accessible, directly or indirectly, via World-Wide-Web (WWW) servers 1012. Sometimes enterprises provide access to the Application Services by making the application servers directly accessible by putting those application servers into a Demilitarized Zone (DMZ) 1011.

A client 1003 may connect via a Local Area Network (LAN) through the enterprise's intranet 1013. Another client 1004 may connect through a Wireless LAN (WLAN) to the intranet 1013. Yet another client 1005 may be located inside the enterprise's campus network 1015, which connects to the enterprise's intranet 1013. An enterprise may have zero or more campuses 1014 and 1015. Yet another client 1001 may connect through the Internet 1000, or a client 1002 may have a mobile connection to the Internet 1000. In any case to prevent illegitimate access to the enterprise's web Application Services, the "inside" of the enterprise's network, the intranet 1013, is protected by having a network perimeter 1010, which may comprise firewalls, associated network interconnect, and additional resources "within" the perimeter network configured so as to be broadly accessible to users on the "outside" of the enterprise.

Virtualization in computing refers to the abstraction of computing resources. It can be used to hide the physical characteristics of computing resources from the way in which other systems, applications, or end users interact with those resources. Virtualization includes making a single physical resource (such as a server, an operating system, an application, or storage device) appear to function as multiple logical resources. Virtualization can also cluster multiple physical resources (such as storage devices or servers) to make them appear as a single logical resource. In enterprise networking, virtualization can be used to achieve high availability, for example by clustering redundant physical resources, or can reduce the total cost of ownership by sharing one partitioned resource among different business units.

SUMMARY OF THE DESCRIPTION

An application network appliance with virtualized services is described herein. According to one embodiment, a packet of a network transaction is received from a client over a first network for accessing an application server of a datacenter over a second network, where the network element operates as an application services gateway of the datacenter. A context associated with the application server is identified based on the packet, including information that identifies one or more application services to be performed on the packet and resources to be allocated for performing the application services. A context includes information representing a logical instance of one or more physical resources of the network element shared by multiple contexts. One or more application services are performed on the packet using the resources identified by the context.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

One aspect of the invention is a system and method for Virtualization in a Layer-7 Networking System, which may be implemented as an ISO Layer-7 networking system which performs network operations for multiple virtual contexts using multiple separate processing elements and where the multiple processing elements are interconnected via a Lossless Data Transport Fabric. Virtual contexts may be mapped directly onto separate processing elements, or processing elements may be virtualized so that they can be shared in some way across subsets of virtual contexts, depending on the specific requirements of a given installation. Further, this system and method provides for termination of multiple transport protocols among multiple virtual contexts. Distinct specific transport protocols may be mapped directly onto and terminated onto distinct specific virtual contexts, or sharing of support for transport protocols may be offered across sets of virtual contexts, depending on the specific requirements of a given installation.

Overview

Figure 2:
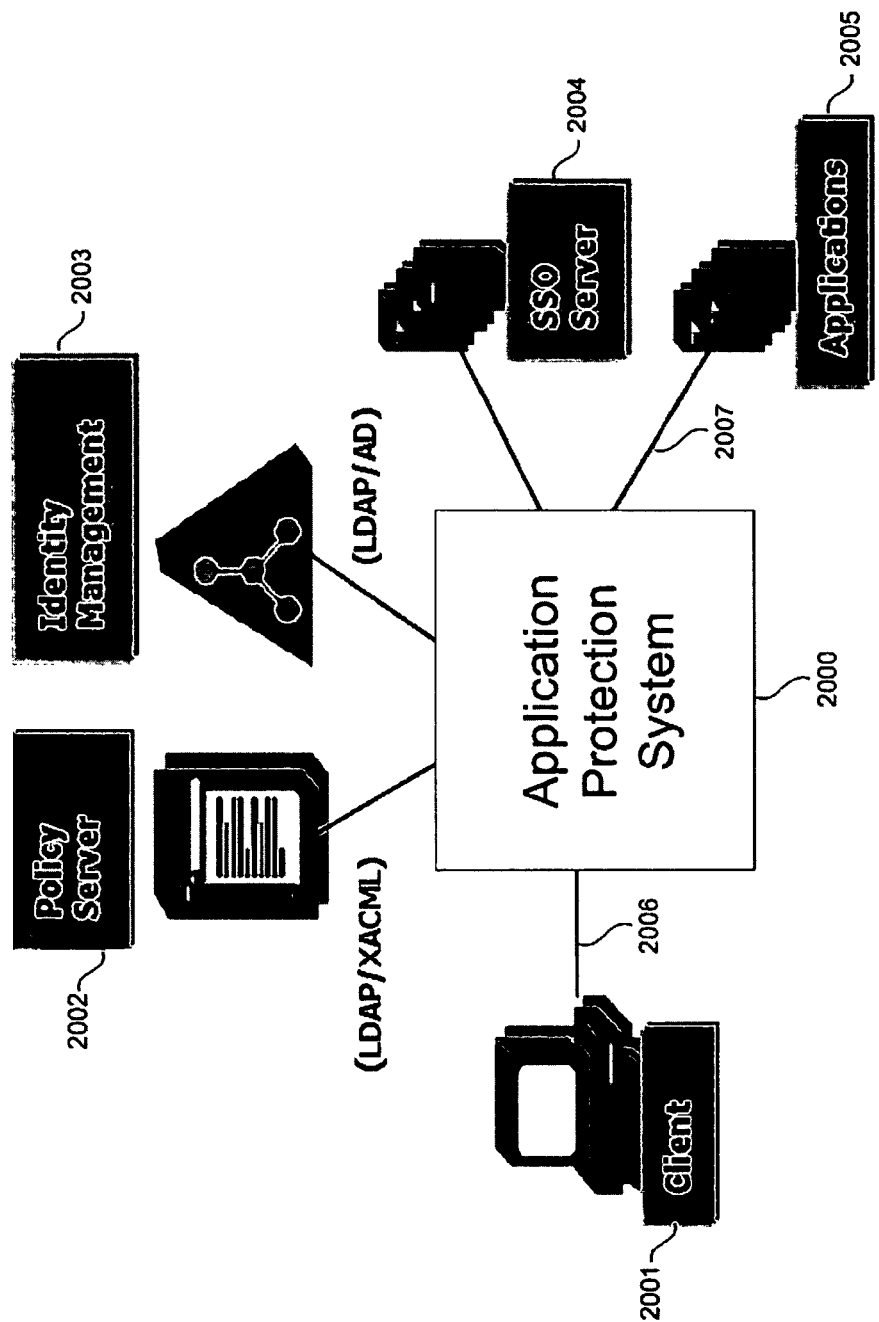
FIG. 2 illustrates the application of an application network appliance (ANA) as the APS according to one embodiment of the invention.

The approach described herein applies combinations of parallel, multi-processor computing technology with lossless, low-latency, high-bandwidth network fabric technology (also known as Lossless Data Transport Fabric, or LDTF) to form novel methods and systems for high performance, high-reliability, high availability, and secure network applications. The various embodiments of the inventions described herein enable the implementation of highly reliable, highly scalable solutions for enterprise networking such as, for example, the APS 2000 from FIG. 2.

Multiple network Services are efficiently provided by terminating transport protocols centrally. As can be seen, any transport protocol can be terminated centrally, each PDU's payload can be collected and converted into a data stream and, vice versa, a data stream can be converted into PDUs for any transport protocol and be transported via the given transport protocol. A simple concatenation of the PDU payload into a byte-stream is not sufficient. Key to the conversion is that state information must be maintained about the meta-data of each connection. Such meta-data includes the session information, for example via a unique connection identification number, the transaction information, as well as the information regarding segments and packets. Finite state machines can be used to track the meta-data.

Transport protocols are protocols which are used to transport information via networks. These include, obviously, the ISO Layer-3 protocols such as IPv4, IPv6, IPSec, the ISO Layer-4 protocols such as TCP, UDP, SCTP, the various ISO Layer-5 protocols such as FTP, HTTP, IMAP, SMTP, GTP, L2TP, PPTP, SOAP, SDP, RTSP, RTP, RTCP, RPC, SSH, TLS, DTLS, SSL, IPSec, and VPN protocols. However, other protocols and approaches are contemplated within the scope of the inventions, which serve as transport mechanisms for transmitting information and application data and can also be terminated in a centralized fashion by a protocol proxy and the corresponding PDUs can be transformed into a data stream for application layer processing. Examples of such are, CSIv2, CORBA, IIOP, DCOM and other Object Request Brokers (ORB), MPEG-TS or RTP as a transport for multimedia information, RTSP or SIP as another transport for multi-media information, peer-to-peer transport mechanisms, transport mechanisms based on J2EE such as Java RMI, streaming media protocols such as VoIP, IPTV, etc.

For the sake of simplicity we will use the term Centralized Transport Protocol Termination throughout the rest of the description, however, this is for exemplary purposes only and is not intended to be limiting. Centralized Transport Protocol Termination can be performed by dedicated processing units, and different ISO Layer-7 services can be performed in other dedicated processing units. The use of a lossless low-latency high-bandwidth fabric for inter-process communication between such dedicated processing units makes it possible to simultaneously support Centralized Transport Protocol Termination for multiple services. For example, TCP can be terminated once, transformed into a data stream and this data stream is transported from one dedicated processing unit to another using the lossless low-latency high-bandwidth fabric. The low-latency nature of the fabric helps to reduce the overall latency in client-to-server transactions.

Figure 1:
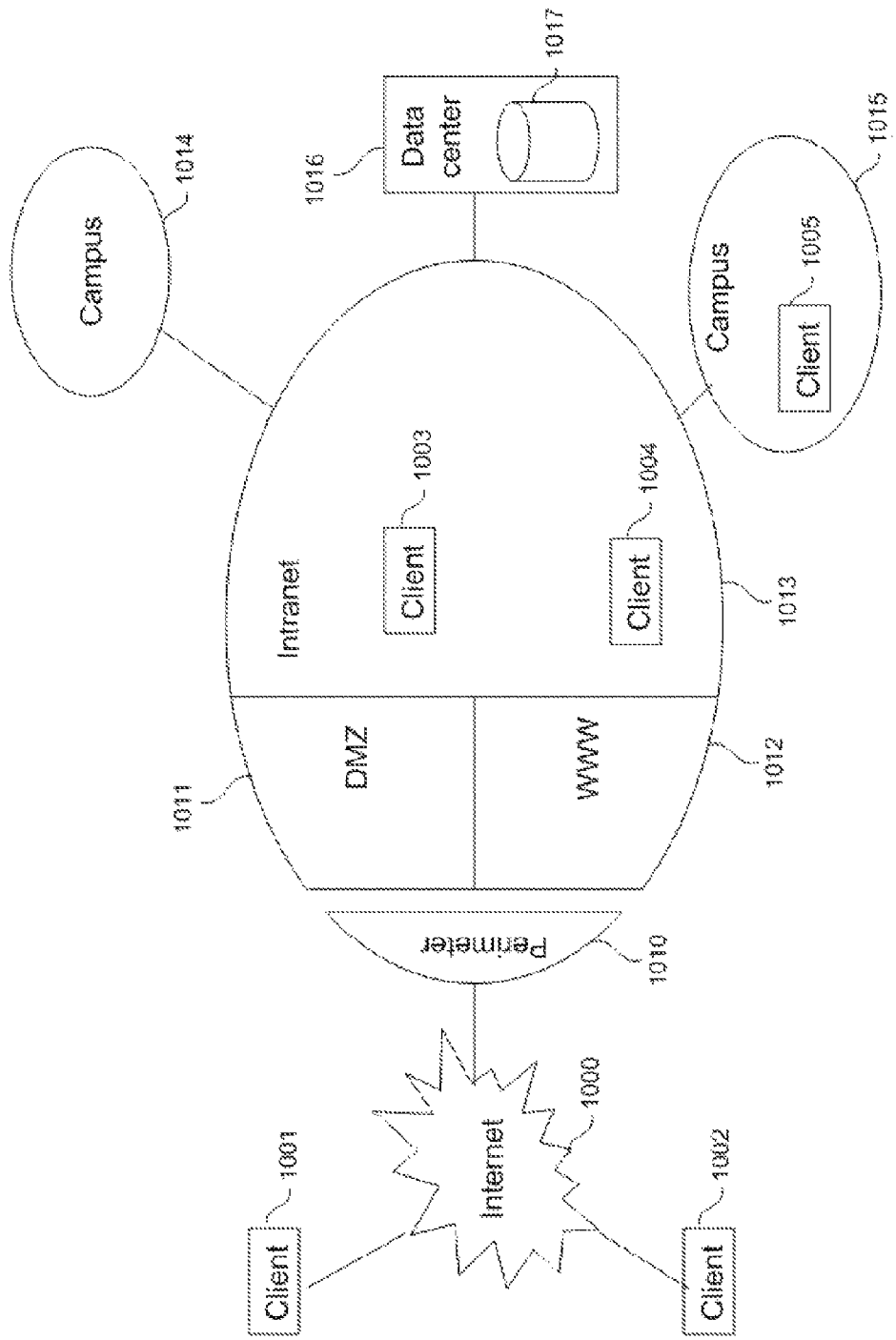
FIG. 1 illustrates a typical corporate computer network connected to the Internet.

In one embodiment, the Application Protection System (APS) 2000 is a network appliance that can act as a proxy between the client 2001 and the application server 2005, and can determine whether a client 2001 shall be granted access to certain applications 2005. In one example, the client 2001 is one or more of the clients 1001, 1002, 1003, 1004, or 1005 of FIG. 1. In another example, the client 2001 can be a virtual machine or a cluster of computers, or a server (for server-to-server connections, for example). The application server 2005 can be, for example, without limitation, one or more file servers, one or more web servers, one or more database servers, one or more compute servers, one or more storage servers or one or more game servers. The decision whether access is granted or rejected involves an Identity Management Server 2003 to identify the user, client, or application, for example using Lightweight Directory Access Protocol (LDAP) or Active Directory (AD), and is the result of querying a Policy Server 2002 to analyze the access policy for the requested application 2005.

The APS 2000 may use a Triangulated Authorization method which, for example, is based on multiple aspects of a client (such as the client 2001), the requested application (such as application 2005) and certain network characteristics: Who—a client (a user or a machine) and its associated attributes such as department, role, project association, seniority, citizenship, etc; Where—network and environment attributes such as access methods (wire-line/wireless/VPN), location (e.g., USA, Switzerland, China) and time; What—on-the-wire session attributes, including protocol and content/resource attributes. The outcome of this Triangulated Authorization method can be used to determine whether access to an application is granted or rejected. Optionally, a Single-Sign-On (SSO) server such as server 2004 may be involved that allows the client 2001 to obtain authorization for accessing multiple applications at once.

One embodiment of the invention acts as a proxy between one or more clients and one or more application servers to control the access of the one or more clients to the one or more applications. This is described, for example, in FIG. 2, where the APS 2000 controls access of client 2001 to application server 2005. Thereby the approach can act as a high-speed, full proxy which terminates both client-side and server-side transport protocol connections, and which behaves as a virtual server to the one or more clients, and as a virtual client to the one or more servers. The proxy function is required because of the need to reassemble PDUs into data streams and (where needed) to decrypt the payload data for inspection such as access control. The proxy function involves ISO Layer-2 to ISO Layer-5 processing such as Centralized Transport Protocol Termination.

One embodiment of the invention is a network appliance which terminates multiple transport protocols in one central point to overcome the many drawbacks of multiple transport protocol termination, such as increased latency and lack of scalability. Therefore, the network appliance may need to perform a set of functions similar to those typical of application servers such as network proxy, deep packet inspection, cryptography, data compression, regular expression parsing, etc. Network services that may need Centralized Transport Protocol Termination include but are not limited to application authentication and authorization, application firewalls, application data routing, in-line intrusion-detection and intrusion prevention, SSL offloading/acceleration, server load balancing, XML offloading/acceleration, and application front-end engine services (also called application acceleration).

ISO Layer-2 to ISO Layer-5 processing typically involves packets, segments and records processing, whereas ISO Layer-7 processing typically involves application data processing. Full ISO Layer-7 inspection goes beyond application headers and typically involves reassembling application layer data. A general rule used in the art is that a 1 GHz processor is needed for processing ISO Layer-3 or ISO Layer-4 PDUs at 1 Gbps, whereas a 10 GHz processor is needed for application data processing at 1 Gbps (for example for SSL VPN URL mangling operation). Therefore, the computational complexity required for scaling the proxy functionality is quite different from the computational complexity required for scaling ISO Layer-7 processing.

To solve the computational complexity in an efficient way, one embodiment of the invention splits the overall ISO Layer-2 to ISO Layer-7 stack into (at least) two independent processing domains. One domain, which is called Network Service processing for ISO Layer-2 to ISO Layer-5 processing (i.e., up to TCP/SSL processing) provides proxy functions, and a second domain which is called Application Service processing for ISO Layer-7 processing. Splitting the stack requires a reliable, lossless, low-latency, high-bandwidth connection between those two (or more) processing domains in order for the Network Service processing to forward the data stream to the Application Service processing for further processing. As a solution, this approach uses a LDTF such as RDMA-capable fabric technology to provide this reliable lossless, low-latency, high-bandwidth interconnect between processing domains.

Figure 3:
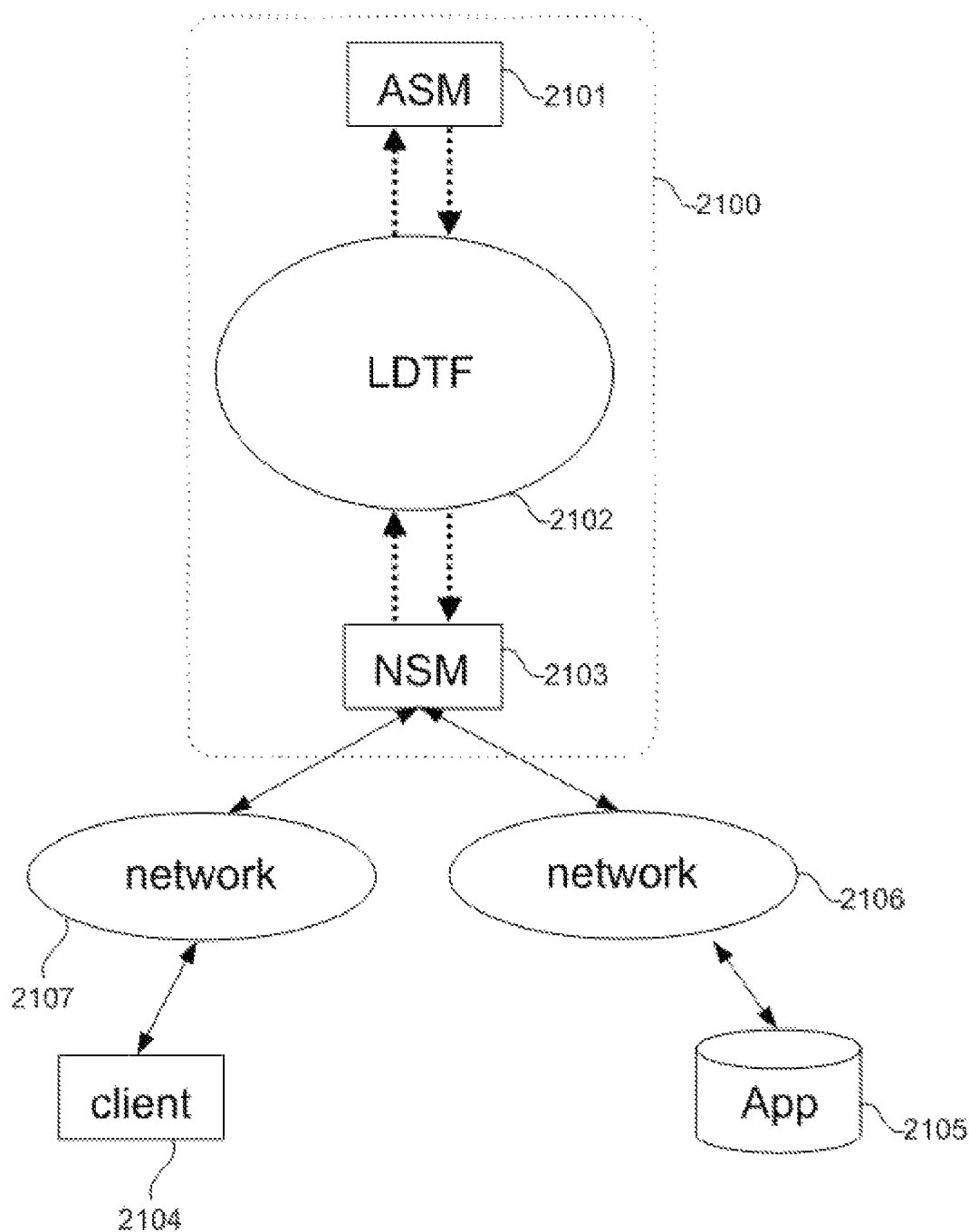
FIG. 3 is a network connected block diagram of an ANA according to one embodiment of the invention.

FIG. 3 is a block diagram illustrating an example of application service appliance system according to one embodiment of the invention. Referring to FIG. 3, ANA 2100 acts as a proxy between a client 2104 and an application server 2105. The client 2104 is connected to the ANA 2100 via a network 2107. Network 2107 can, for example, be a LAN, a WAN, a WLAN, an intranet, or the Internet. The application server 2105 is connected to the ANA 2100 via network 2106. Network 2106 can, for example, be a LAN, a WAN, a WLAN, an intranet, or the Internet. Networks 2106-2107 may be the same network or different networks. While it is apparent that multiple clients and multiple application servers may be connected to the ANA 2100, for the sake of simplicity a single client, single application server case is used as a placeholder throughout. Incoming connections, for example, a request from the client 2104 is terminated in the NSM 2103 and is transformed into a data stream. This is done by PDU processing and reassembling the payload of the PDU into a data stream of ISO Layer-7 application data. This data stream is transported via LDTF 2102 to the ASM 2101 for further ISO Layer-7 processing. LDTF 2102 may be an RDMA or IB compatible fabric. The result of ISO Layer-7 processing done by ASM 2101 is then transported back—still as a data stream—via the LDTF 2102 to the NSM 2103. The NSM 2103 then transforms the data stream into PDUs and sends the PDUs to the application server 2105 via the appropriate transport protocol. Connections which originate from the application server 2105 can be handled similarly.

Using this novel approach, both processing domains can be scaled independent of each other and a well-balanced system can be achieved at reasonable costs.

L2-L5 Processing Unit—NSM

Figure 4:
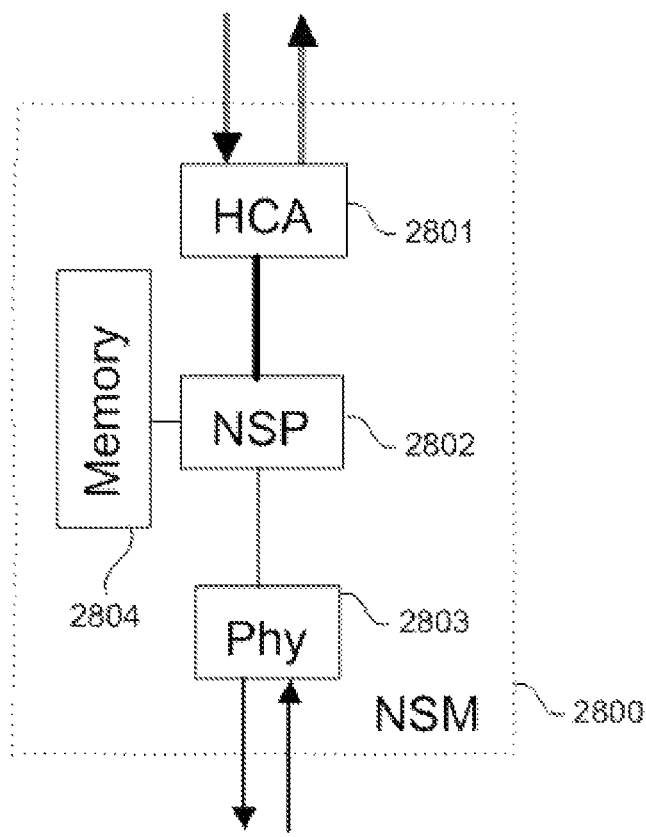
FIG. 4 is a block diagram of a Network Service Module (NSM) of an ANA according to one embodiment of the invention.

A NSM processes the lower network layers, ISO Layer-2 to ISO Layer-5. In one embodiment of the invention, such a NSM can be constructed as shown in FIG. 4. The NSM 2800 comprises a host channel adapter (HCA) 2801, a network services processor (NSP) 2802, and physical network layer receiver (Phy) 2803 and memory 2804. The host channel adapter 2801 connects to the LDTF, which can be IB fabric. The physical network layer receiver 2803 connects to Ethernet. The NSP 2803 runs programs stored in memory 2804 to perform ISO Layer-2 to ISO Layer-5 processing, such as Centralized Transport Protocol Termination, PDU reassembly to transform the PDU payload into a data stream, cryptographic processing, etc.

Figure 5:
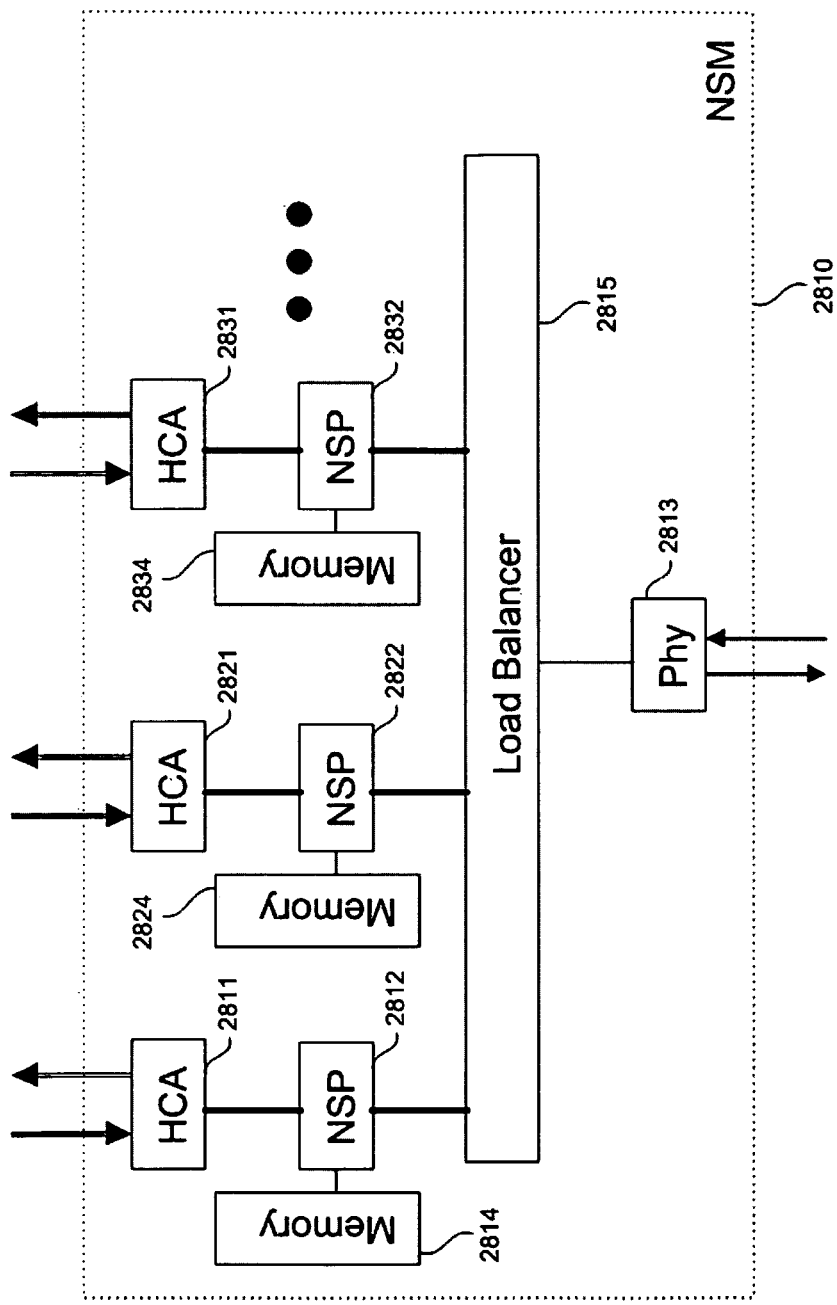
FIG. 5 is a block diagram of a NSM of an ANA according to another embodiment of the invention.

For better scalability, in one embodiment of the invention, a NSM can be a multi-processor architecture, as shown in FIG. 5. Here the NSM 2810 can comprise two—or more— NSPs, such as NSP 2812, NSP 2822, NSP 2832, each having a dedicated host channel adapter, such as host channel adapter 2811, host channel adapter 2821, and host channel adapter 2831, and dedicated memory, such as memory 2814, memory 2824, and memory 2834. A load balancer 2815 is in between the NSPs and the physical network layer receiver 2813 and balances the network load between the two—or more— NSPs. The load balancer 2815 can use common approaches known in the art to balance ingress or egress network traffic.

L7 Processing Unit—ASM

Figure 6:
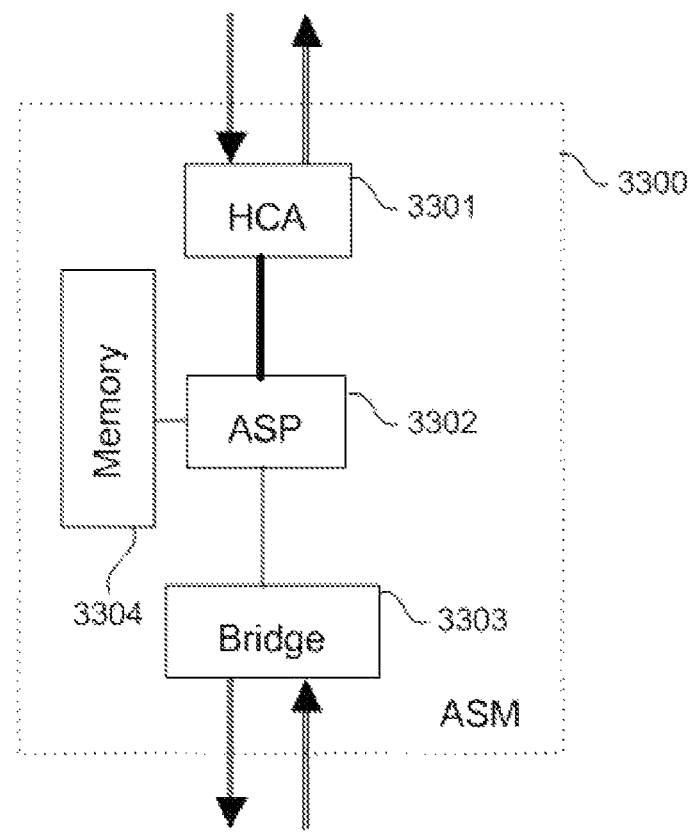
FIG. 6 is a block diagram of an Application Service Module (ASM) of an ANA according to one embodiment of the invention.

An ASM performs the ISO Layer-7 services, including application data processing on the data stream, which is the data stream of the transport protocol's PDU payload transformed by one or more NSMs. FIG. 6 illustrates how an ASM can be constructed in one embodiment of the invention. The ASM 3300 comprises a host channel adapter (HCA) 3301, an Application Service Processor (ASP) 3302, a bridge 3303 and memory 3304. The host channel adapter 3301 connects to the converged data center fabric which can be, for example, without limitation, LDTF or IB fabric. The bridge 3303 connects to the LDTF as a link to NSMs, for example. The ASP 3302 runs programs stored in memory 3304 to examine all ISO Layer-7 traffic and to perform ISO Layer-7 processing such as regular expression parsing, compression and decompression, standard and custom protocol proxy functions, etc.

Figure 7:
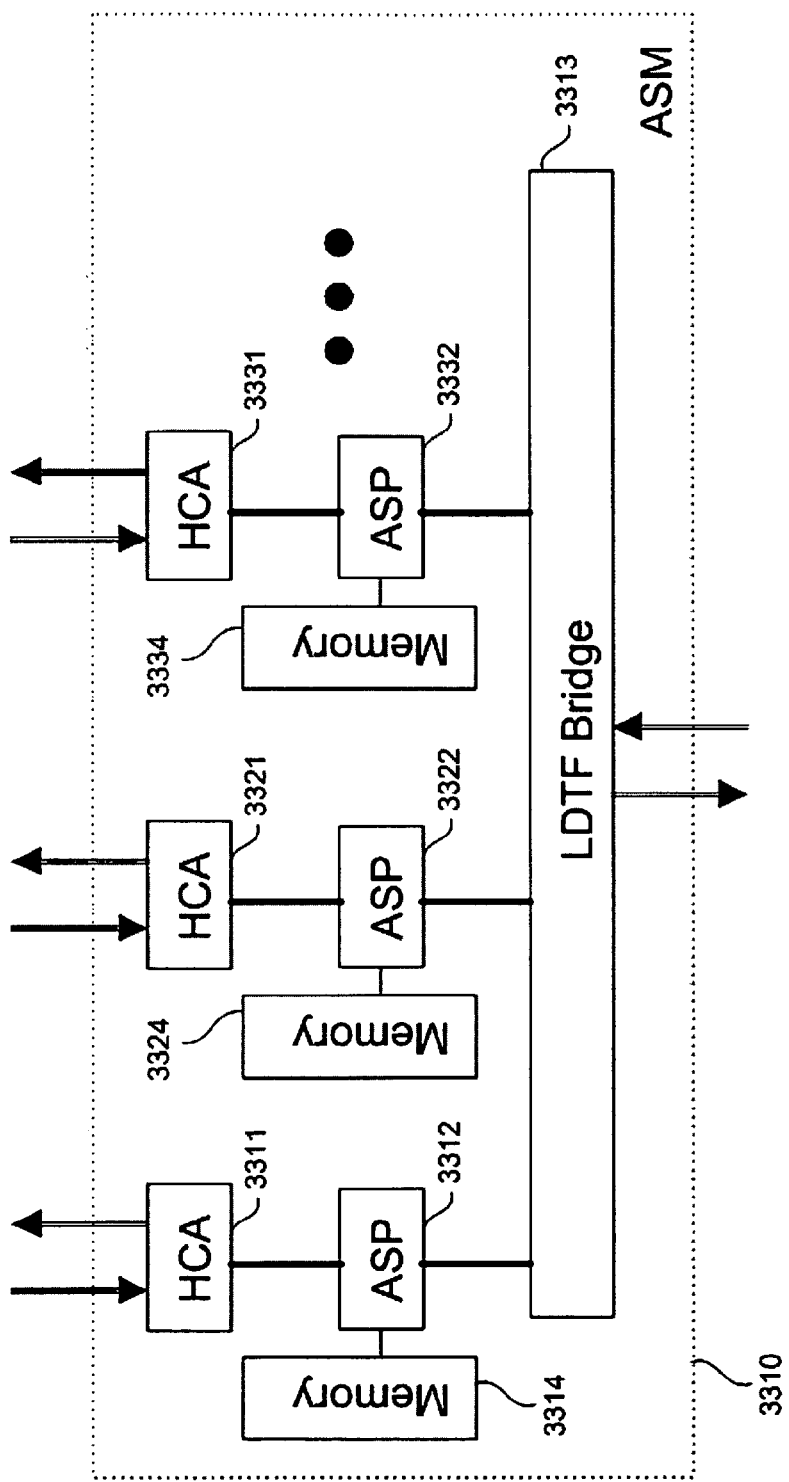
FIG. 7 is a block diagram of an ASM of an ANA according to another embodiment of the invention.

For those tasks a high compute power is needed, typically more than for plain ISO Layer-2 to ISO Layer-5 processing. Therefore, a single-processor architecture using existing micro-processors may require hardware assist to provide sufficient compute power for high-bandwidth client-to-server connections. Alternatively, it may be advantageous to implement an ASM either as a homogeneous multi-processor system of generic ISO Layer-7 processing units, or as a heterogeneous multi-processing system using a sea of different, specialized ISO Layer-7 processing units. FIG. 7 shows such a multi-processor architecture: Here the ASM 3310 can comprise two—or more—ASPs, such as ASP 3312, ASP 3322, ASP 3332, each having a dedicated host channel adapter, such as host channel adapter 3311, host channel adapter 3321, and host channel adapter 3331, and dedicated memory, such as memory 3314, memory 3324, and memory 3334. The LDTF bridge 3313 connects the ASPs via the LDTF to the NSMs, for example.

For building the multi-processor architecture of the ASM several options exist: A multi-core processor technology can be used, which can be a System-on-a-Chip with on-chip hardware accelerators; or one can use multi-core processors with external co-processors, for example, a co-processor for cryptographic operations, a co-processor for regular expression analysis, a co-processor for data compression and decompression, etc. A parallel-mode compute architecture can be deployed which will require a flow dispatcher to distribute incoming traffic across the multiple processors. A pipelined-mode compute architecture can be used, where one processing element acts as a pre-processor for a subsequent processing element. Or, a hybrid approach can be used combining parallel mode with pipelined compute architectures. Further, any other architecture contemplated by one of skill in the art may be used.

LDTF to Connect L2-L5 Unit with L7 Units

Figure 8:
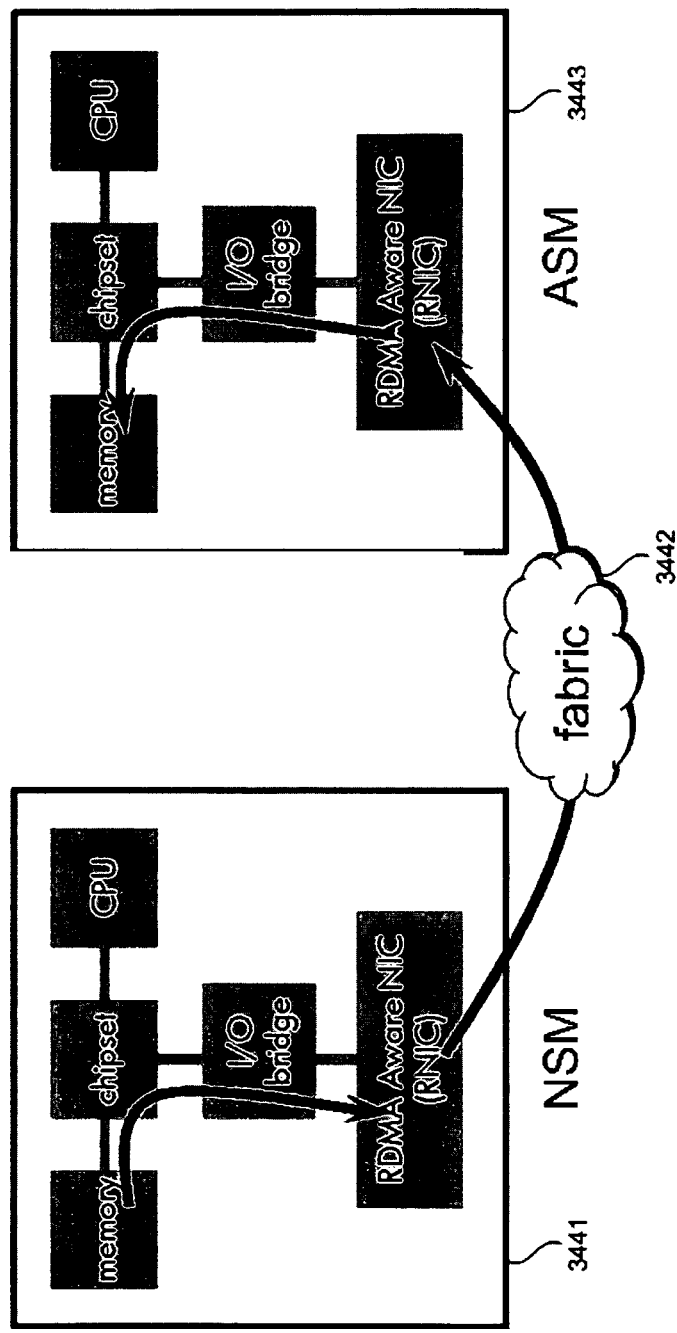
FIG. 8 is a block diagram which illustrates LDTF connectivity between a NSM and an ASM of an ANA according to one embodiment of the invention.

In any case, the compute architecture requires a lossless, low-latency, high-bandwidth fabric for any-to-any inter-process communication links between the one or more NSMs (which each may comprise one or more NSPs) and the one or more ASMs (which each may comprise one or more ASPs). FIG. 8 shows how in one embodiment of the invention, one ISO Layer-2 to ISO Layer-5 processing unit, NSM 3441, and one ISO Layer-7 processing unit, ASM 3443, can be connected via the LDTF 3442. Key to the connection is the use of an RDMA network interface connector (RNIC) which can be a host channel adapter for IB, for example, host channel adapter 2801, or host channel adapter 2811, or host channel adapter 2821, or host channel adapter 2831, or host channel adapter 3301, or host channel adapter 3311, or host channel adapter 3321, or host channel adapter 3331. Of course, two or more ISO Layer-2 to ISO Layer-5 processing units can be connected to two or more ISO Layer-7 processing units accordingly.

Many options exist for implementing the LDTF 3442: In one embodiment of the invention the LDTF can be IB. In another embodiment of the invention the LDTF can be Data Center Ethernet with RDMA support. In yet another embodiment of the invention, the LDTF can be iWARP which supports RDMA over TCP. Besides being a lossless, low-latency, high-bandwidth interconnect means RDMA enables the performance of RDMA one-sided read-based load monitoring and can be used to map connection level flow control using RDMA queue-pair flow control.

Virtual Lanes

In yet another embodiment of the invention, when IB is used for the LDTF, virtual lanes in IB can be used to partition the communication, for example for hardware virtualization, or for separating system management communication from network traffic, or to partition an ANA into multiple logical instances, or to have an independent administrative domain. IB virtual lanes are part of the IB link layer. A virtual lane is a unique logical communication link that shares a single physical link. In IB technology each physical link can have up to 15 virtual lanes and a management lane. As a packet travels through the subnet, it can be assigned a priority or service level. Higher-priority packets are sent down special virtual lanes ahead of other packets.

Fully Virtualized Operations

Virtualization provides a way to manage resources independent of the underlying physical implementation to increase utilization, efficiency and flexibility. For example, it allows partitioning a single physical resource into multiple logical instances with independent administration domains, which is helpful in a managed Network Service deployment.

Contexts are key constructs for describing the virtualization features according to certain embodiments of the inventions. A context is a combination of Policy Administration Point (PAP), Policy Decision Point (PDP) and Policy Enforcement Point (PEP). Typically, an administrative boundary is identified by the context.

In one embodiment of the invention, the concept of service level is used to provide differentiated services among one or more contexts. The service levels can be used to control hard resources such as processor bandwidth, memory and network bandwidth. There can be one or more service levels within one ANA. One embodiment of the invention can utilize the virtual lanes of the internal LDTF to support differentiated services. A certain set of a virtual domain's traffic can be mapped to use one or more virtual lanes, and hence provide differentiated services among the contexts. As a practical example, according to one embodiment of the invention, an enterprise may have multiple business units and each business unit may have multiple application servers. In the virtualization terminology used within this description, each business unit and/or each application server's policy (or group of application servers if the policy administrative owner is same for the group of application servers) can be mapped to a context.

Figure 9:
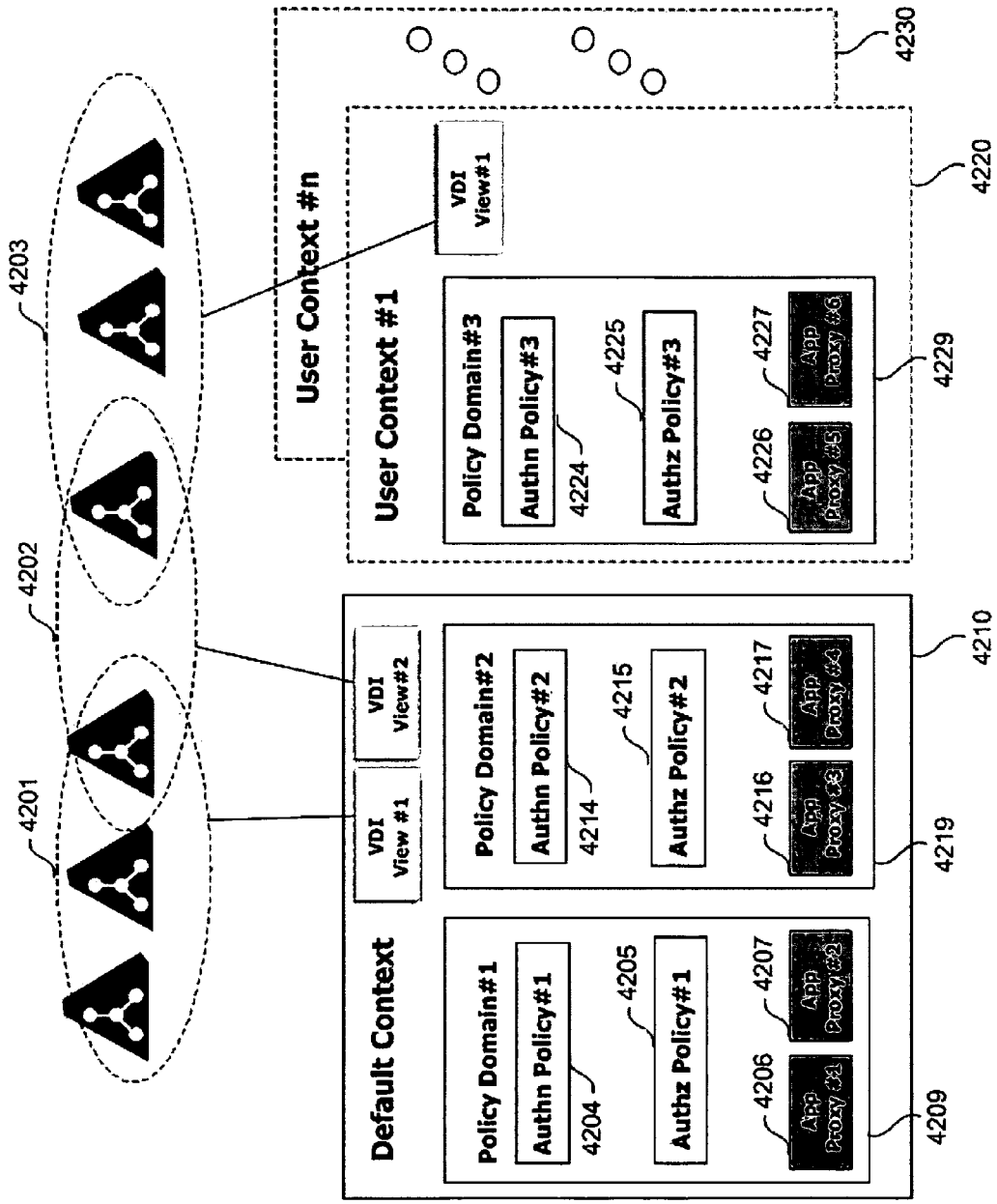
FIG. 9 is a block diagram of virtualized policy contexts in an ANA according to one embodiment of the invention.

In one embodiment of the invention, ANAs can have one or more contexts, which are associated with one or more Policy Domains. This is illustrated in FIG. 9 where an ANA comprises the default context 4210, plus the user context 4220, plus the user context 4230 etc. The default context 4210 can comprise one or more policy domains, such as the policy domain 4209 and the policy domain 4219. Each policy domain can comprise one or more policies and application proxies. For example, the policy domain 4209 comprises an authentication policy 4204, an authorization policy 4205, an application proxy 4206, and an application proxy 4207. The policy domain 4219 comprises an authentication policy 4214, an authorization policy 4215, an application proxy 4216, and an application proxy 4217. The user context 4220, for example, can comprise the policy domain 4229 which itself comprises the authentication policy 4224, the authorization policy 4225, the application proxy 4226 and the application proxy 4227. Each context can comprise Virtual Directory Infrastructure to access the directory servers, for example, directory server 4201, directory server 4202, or directory server 4203, accordingly.

Figure 10:
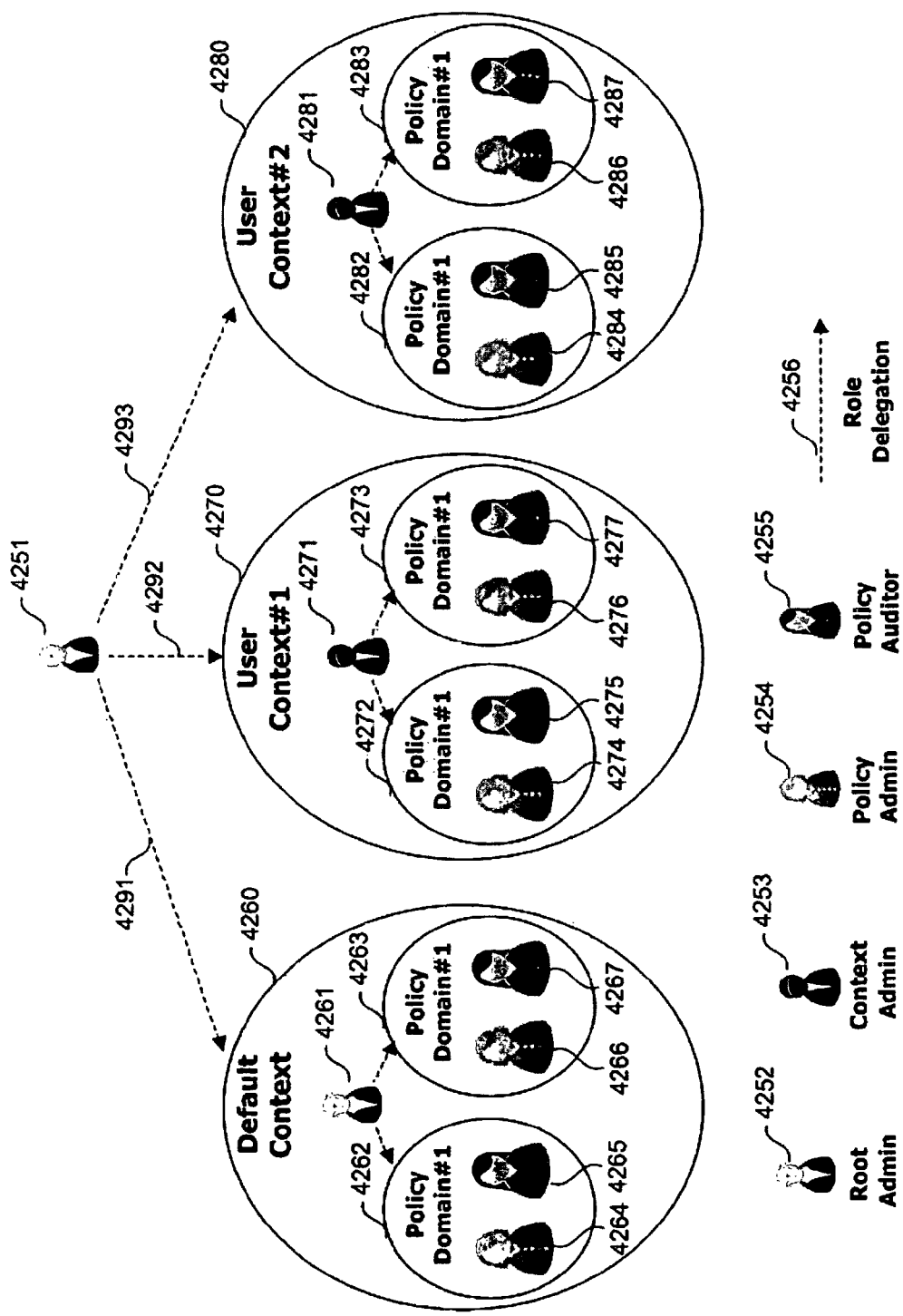
FIG. 10 is a block diagram which illustrates administration of virtualized policies in an ANA according to one embodiment of the invention.

For policy administration purposes a hierarchical approach can be used which is shown in FIG. 10. A root administrator 4251 can delegate administration to root administrator 4261 who administers the default context 4260. The root administrator 4251 can also delegate administration of user context 4270 to context administrator 4271, and administration of user context 4280 to context administrator 4281, for example. Again, context administrators can delegate administration to policy domains. For example, root administrator 4261 can delegate administration of policy domain 4262 to policy administrator 4264 while policy auditing can be performed by policy auditor 4265, and root administrator 4261 can delegate administration of policy domain 4263 to policy administrator 4266 while policy auditing can performed by policy auditor 4267. Context administrator 4271 can delegate administration of policy domain 4272 to policy administrator 4274 while policy auditing can be performed by policy auditor 4275, and context administrator 4271 can delegate administration of policy domain 4273 to policy administrator 4276 while policy auditing can be performed by policy auditor 4277. Context administrator 4281 can delegate administration of policy domain 4282 to policy administrator 4284 while policy auditing can be performed by policy auditor 4285, and context administrator 4281 can delegate administration of policy domain 4283 to policy administrator 4286, while policy auditing can be performed by policy auditor 4287.

As a result, a network-centric application-agnostic access control platform can be built which provides guaranteed isolation of the virtual contexts and domains at all levels. For example, without limitation ISO Layer-2 to ISO Layer-4 Network Services of one context can be isolated from another context's ISO Layer-2 to ISO Layer-4 network services, ISO Layer-5 to ISO Layer-7 network services of one context can be isolated another context's ISO Layer-5 to ISO Layer-7 network services, command line interfaces for one context can be isolated from the command line interface of another context, accounting operations from one context can be isolated from the accounting operations from another context, etc. Isolation means that contexts can independently be created, deleted, managed, administered, modified, viewed, analyzed, logged, etc. from each other (see FIG. 10). Further, other divisions of labor among the ISO layers may be contemplated by one of skill in the art; the division may be into two or more service planes, or collections of ISO layers, as may be appropriate to what is needed in a given application.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
at a network element, receiving one or more packets of a network transaction from a client over a first network for accessing an application server of a datacenter over a second network;
storing meta-data associated with each of the packets, wherein the meta-data stores information for communication links and including session information and transaction information of the packets in the form of unique communication identifiers and information for converting a protocol data unit (PDU) of the packet into a data stream for application layer processing;
identifying a context associated with application services to be performed on the received packets based on a priority level assigned to each of the packets, the context including authorization and authentication policies;
associating the context with the received packets;
splitting processing operations of the packets into two independent processing domains such that a first processing domain is for layer 2 network service processing of the packets and a second processing domain is for layer 7 application service processing of the packets;
providing one or more virtual communication links which share a single physical link that maps to a network unit having multiple network servers and application servers and wherein each of the virtual communication links of the physical link is associated with at least one network server of the network unit to provide the layer 2 network service processing on each of the received packets and at least one application server of the network unit to provide the layer 7 application service processing on each of the received packets based on the identified context;

mapping the received packets to the one or more virtual communication links based on the context and application services to be provided on the received packets such that the virtual links provide differentiated application services on the packets based on a service level associated with the context in order to control processing resources of the network element; and designating one or more packets as high priority packets based on the service level associated with the packets to guarantee isolation of the context and domain of the packet based on one or more service policies set by the application server; and mapping the high priority packets to one of the virtual communication links designated as a high priority virtual communication link such that the high priority packets are mapped to the at least one network server and the at least one application server of the network unit before other packets.

2. The method of claim 1, wherein identifying comprises identifying the context based on a destination internet protocol (IP) address and layer-4 information specified within the received packets.

3. The method of claim 1, wherein mapping comprises mapping the received packets to a particular application server of the datacenter associated with a particular business unit of an enterprise.

4. The method of claim 1, wherein providing comprises providing the one or more virtual communication links that map to multiple network units, wherein each network unit comprises one or more policy domains that specify multiple policies as to how the application services are to be performed on the packets.

5. The method of claim 4, further comprising authenticating a user associated with the packets using the authentication policy identified by the policy domains.

6. The method of claim 5, further comprising authorizing the user associated with the packets using the authorization policy identified by the policy domains.

7. The method of claim 6, wherein authorizing comprises authorizing the user using one or more user attributes with respect to the application servers to determine whether the user is eligible to access the application servers.

8. The method of claim 4, wherein providing comprises providing the one or more virtual communication links that map to multiple network units that comprise one or more application proxies, wherein each application proxy identifies types of one or more application services to be performed on the received packets.

9. The method of claim 8, further comprising performing application services at the network element that comprises a plurality of service modules, and identifying with an application proxy which of the service modules to perform the application services, wherein the application proxy further identifies hardware resources allocated to the identified service modules.

10. A non-transitory machine-readable storage medium having instructions stored therein, which when executed by a machine, cause the machine to:

receive one or more packets of a network transaction from a client over a first network for accessing an application server of a datacenter over a second network;

store meta-data associated with each of the packets, wherein the meta-data stores information for communication links and including session information and transaction information of the packets in the form of unique communication identifiers and information for converting a protocol data unit (PDU) of the packet into a data stream for application layer processing;

identify a context associated with application services to be performed on the received packets based on a priority level assigned to each of the packets, the context including authorization and authentication policies;

associate the context with the received packets;

split processing operations of the packets into two independent processing domains such that a first processing domain is for layer 2 network service processing of the packets and a second processing domain is for layer 7 application service processing of the packets;

provide one or more virtual communication links which share a single physical link that maps to a network unit having multiple network servers and application servers and wherein each of the virtual communication links of the physical link is associated with at least one network server of the network unit to provide the layer 2 network service processing on each of the received packets and at least one application server of the network unit to provide the layer 7 application service processing on each of the received packets based on the identified context;

map the received packets to one or more virtual communication links based on the context and application services to be provided on the received packets such that the virtual links provide differentiated application services on the received packets based on a service level associated with the context in order to control processing resources of the network element; and designate one or more packets as high priority packets based on the service level associated with the packets to guarantee isolation of the context and domain of the packet based on one or more service policies set by the application server; and map the high priority packets to one of the virtual communication links designated as a high priority virtual communication link such that the high priority packets are mapped to the at least one network server and the at least one application server of the network unit before other packets.

11. The non-transitory machine-readable storage medium of claim 10, wherein the instructions that cause the machine to identify comprise instructions that cause the machine to identify the context based on a destination internet protocol (IP) address and layer-4 information specified within the received packets.

12. The non-transitory machine-readable storage medium of claim 10, wherein the instructions that cause the machine to map the received packets comprise instructions that cause the machine to map the received packets to a particular application server of the datacenter associated with a particular business unit of an enterprise.

13. The non-transitory machine-readable storage medium of claim 10, wherein the instructions that cause the machine to provide the one or more virtual communication links comprise instructions that cause the machine to provide one or more virtual communication links that map to multiple network units, wherein each network unit comprises one or more policy domains that specify multiple policies as to how the application services are to be performed on the received packets.

14. The non-transitory machine-readable storage medium of claim 13, further comprising instructions that cause the machine to authenticate a user associated with the packets using the authentication policy identified by the policy domains.

15. The non-transitory machine-readable storage medium of claim 14, further comprising instructions that cause the machine to authorize the user associated with the packets using the authorization policy identified by the policy domains.

16. The non-transitory machine-readable storage medium of claim 15, wherein the instructions that cause the machine to authorize comprise instructions that cause the machine to authorize the user using one or more user attributes with respect to the application servers to determine whether the user is eligible to access the application servers.

17. The non-transitory machine-readable storage medium of claim 15, wherein the instructions that cause the machine to provide the one or more virtual communication links comprise instructions that cause the machine to provide one or more virtual communication links that map to multiple network units that comprise one or more application proxies, wherein each application proxy identifies types of one or more application services to be performed on the received packets.

18. The non-transitory machine-readable storage medium of claim 17, further comprising instructions that cause the machine to perform application services at the network element that comprises a plurality of service modules, wherein an application proxy identifies which of the service modules to perform the application services and further identifies hardware resources allocated to the identified service modules.

19. The method of claim 1, wherein mapping comprises mapping the received packets to the virtual communication links based on the priority level assigned to the packets.

20. The non-transitory machine-readable storage medium of claim 10, wherein the instructions that cause the machine to map comprise instructions that cause the machine to map the received packets to the virtual communication links based on the priority level assigned to the packets.

21. An apparatus comprising:
a network interface;
a memory; and
a processor coupled to the network interface and memory, and configured to:
receive one or more packets of a network transaction from a client over a first network for accessing an application server of a datacenter over a second network;
store meta-data associated with each of the packets, wherein the meta-data stores information for communication links and including session information and transaction information of the packets in the form of unique communication identifiers and information for converting a protocol data unit (PDU) of the packet into a data stream for application layer processing;
identify a context associated with application services to be performed on the received packets based on a priority level assigned to each of the packets, the context including authorization and authentication policies;
associate the context with the received packets;
split processing operations of the packets into two independent processing domains such that a first processing domain is for layer 2 network service processing of the packets and a second processing domain is for layer 7 application service processing of the packets;
provide one or more virtual communication links which share a single physical link that maps to a network unit having multiple network servers and application servers and wherein each of the virtual communication links of the physical link is associated with at least one network server of the network unit to provide the layer 2 network service processing on each of the received packets and at least one application server of the network unit to provide the layer 7 application service processing on each of the received packets based on the identified context;
map the received packets to the one or more virtual communication links based on the context and application services to be provided on the received packets such that the virtual links provide differentiated application services on the received packets based on a service level associated with the context in order to control processing resources of the apparatus; and
designate one or more packets as high priority packets based on the service level associated with the packets to guarantee isolation of the context and domain of the packet based on one or more service policies set by the application server; and
map the high priority packets to one of the virtual communication links designated as a high priority virtual communication link such that the high priority packets are mapped to the at least one network server and the at least one application server of the network unit before other packets.

22. The apparatus of claim 21, wherein the processor is further configured to provide the one or more virtual communication links that map to multiple network units, wherein each network unit comprises one or more policy domains that specify multiple policies as to how the application services are to be performed on the received packets.

23. The apparatus of claim 21, wherein the processor is further configured to map the received packets to the virtual communication links based on the priority level assigned to the received packets.

24. The method of claim 2, wherein identifying the context based on the destination IP address and layer-4 information comprises isolating the context from layer-2 to layer-4 information associated with another context.

25. The non-transitory machine-readable storage medium of claim 11, wherein the instructions that cause the machine to identify the context based on a destination IP address and layer-4 information comprises instructions that cause the machine to isolate the context from layer-2 to layer-4 information associated with another context.

* * * * *